United States Patent
Kobilarov

(10) Patent No.: US 12,162,513 B2
(45) Date of Patent: Dec. 10, 2024

(54) ROUTE-RELATIVE TRAJECTORY NUMERICAL INTEGRATOR AND CONTROLLER USING THE SAME

(71) Applicant: Zoox, Inc., Foster City, CA (US)

(72) Inventor: Marin Kobilarov, Baltimore, MD (US)

(73) Assignee: Zoox, Inc., Foster City, CA (US)

( * ) Notice: Subject to any disclaimer, the term of this patent is extended or adjusted under 35 U.S.C. 154(b) by 115 days.

(21) Appl. No.: 17/670,357

(22) Filed: Feb. 11, 2022

(65) Prior Publication Data

US 2022/0250646 A1 Aug. 11, 2022

Related U.S. Application Data

(60) Provisional application No. 63/148,295, filed on Feb. 11, 2021.

(51) Int. Cl.
B60W 60/00 (2020.01)
B60W 50/00 (2006.01)
G01C 21/34 (2006.01)

(52) U.S. Cl.
CPC ...... B60W 60/001 (2020.02); B60W 50/0097 (2013.01); G01C 21/3453 (2013.01); B60W 2520/00 (2013.01); B60W 2552/53 (2020.02); B60W 2556/50 (2020.02)

(58) Field of Classification Search
CPC ........... B60W 60/001; B60W 50/0097; B60W 2520/00; B60W 2552/53; B60W 2556/50; B60W 2520/105; B60W 2710/207; B60W 60/0011; G01C 21/3453
See application file for complete search history.

(56) References Cited

U.S. PATENT DOCUMENTS

| | | | |
|---|---|---|---|
| 8,543,261 B2 | 9/2013 | Anderson et al. | |
| 2005/0085341 A1* | 4/2005 | Kettenacker | B60W 30/188 477/107 |
| 2005/0113983 A1* | 5/2005 | Schubert | B60R 21/01332 701/1 |
| 2009/0319113 A1* | 12/2009 | Lee | G01C 21/12 701/1 |
| 2010/0057361 A1* | 3/2010 | Caveney | B60W 30/08 701/469 |
| 2015/0353085 A1* | 12/2015 | Lee | B60W 30/10 701/533 |
| 2017/0267286 A1 | 9/2017 | Takamatsu et al. | |

(Continued)

OTHER PUBLICATIONS

U.S. Appl. No. 15/843,512, filed Dec. 15, 2017, now U.S. Pat. No. 10,671,075.

(Continued)

Primary Examiner — Khoi H Tran
Assistant Examiner — Tien Minh Le
(74) Attorney, Agent, or Firm — Lee & Hayes, P.C.

(57) ABSTRACT

Generating a lane reference from a roadway shape and/or generating a trajectory for controlling an autonomous vehicle may include determining a predicted state of the lane reference and/or a candidate trajectory by an integrator. The disclosed integrator is implemented as a numerical integrator in predominantly closed-form that is able to avoid singularities while maintaining no approximation error. The disclosed integrator is also more robust to poor initial estimations, high curvature roadways, and zero-velocity conditions.

20 Claims, 5 Drawing Sheets

(56) References Cited

U.S. PATENT DOCUMENTS

| | | |
|---|---|---|
| 2018/0348779 A1 | 12/2018 | Oniwa |
| 2019/0033085 A1 | 1/2019 | Ogale et al. |
| 2019/0034794 A1 | 1/2019 | Ogale et al. |
| 2019/0220016 A1 | 7/2019 | Phillips et al. |
| 2019/0278284 A1 | 9/2019 | Zhang et al. |
| 2019/0361450 A1* | 11/2019 | Sheckells .............. B60W 30/10 |
| 2020/0097016 A1 | 3/2020 | Zhu |
| 2020/0174490 A1 | 6/2020 | Ogale et al. |
| 2021/0109539 A1 | 4/2021 | Kobilarov |
| 2021/0403034 A1* | 12/2021 | Lapin ................ B60W 50/0098 |
| 2022/0196852 A1* | 6/2022 | Reimer ................... G01S 19/54 |

OTHER PUBLICATIONS

U.S. Appl. No. 15/843,596, filed Dec. 15, 2017, now U.S. Pat. No. 10,379,538.
U.S. Appl. No. 15/963,833, filed Apr. 26, 2018, now U.S. Pat. No. 10,649,459.
U.S. Appl. No. 16/147,492, filed Sep. 28, 2018, now U.S. Pat. No. 10,831,210.
U.S. Appl. No. 17/394,334, filed Aug. 4, 2021.
Office Action for U.S. Appl. No. 17/092,614, mailed Jul. 20, 2022, Kobilarov, "Trajectory Generation and Optimization Using Closed-Form Numerical Integration in Route-Relative Coordinates", 13 pages.

* cited by examiner

ROUTE-RELATIVE TRAJECTORY NUMERICAL INTEGRATOR AND CONTROLLER USING THE SAME

RELATED MATTER

This application claims the benefit of U.S. Provisional Application No. 63/148,295, filed Feb. 11, 2021, the entirety of which is incorporated by reference herein.

BACKGROUND

Various methods, apparatuses, and systems are utilized by autonomous vehicles to guide such autonomous vehicles through environments including static and dynamic objects. For instance, autonomous vehicles can utilize route planning methods, apparatuses, and systems to guide autonomous vehicles through congested areas with other moving vehicles (autonomous or otherwise), moving people, stationary buildings, etc. In some examples, generating routes for an autonomous vehicle can include optimizing vehicle acceleration and steering angle separately, which can be inefficient in a resource-limited or a time-limited environment.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
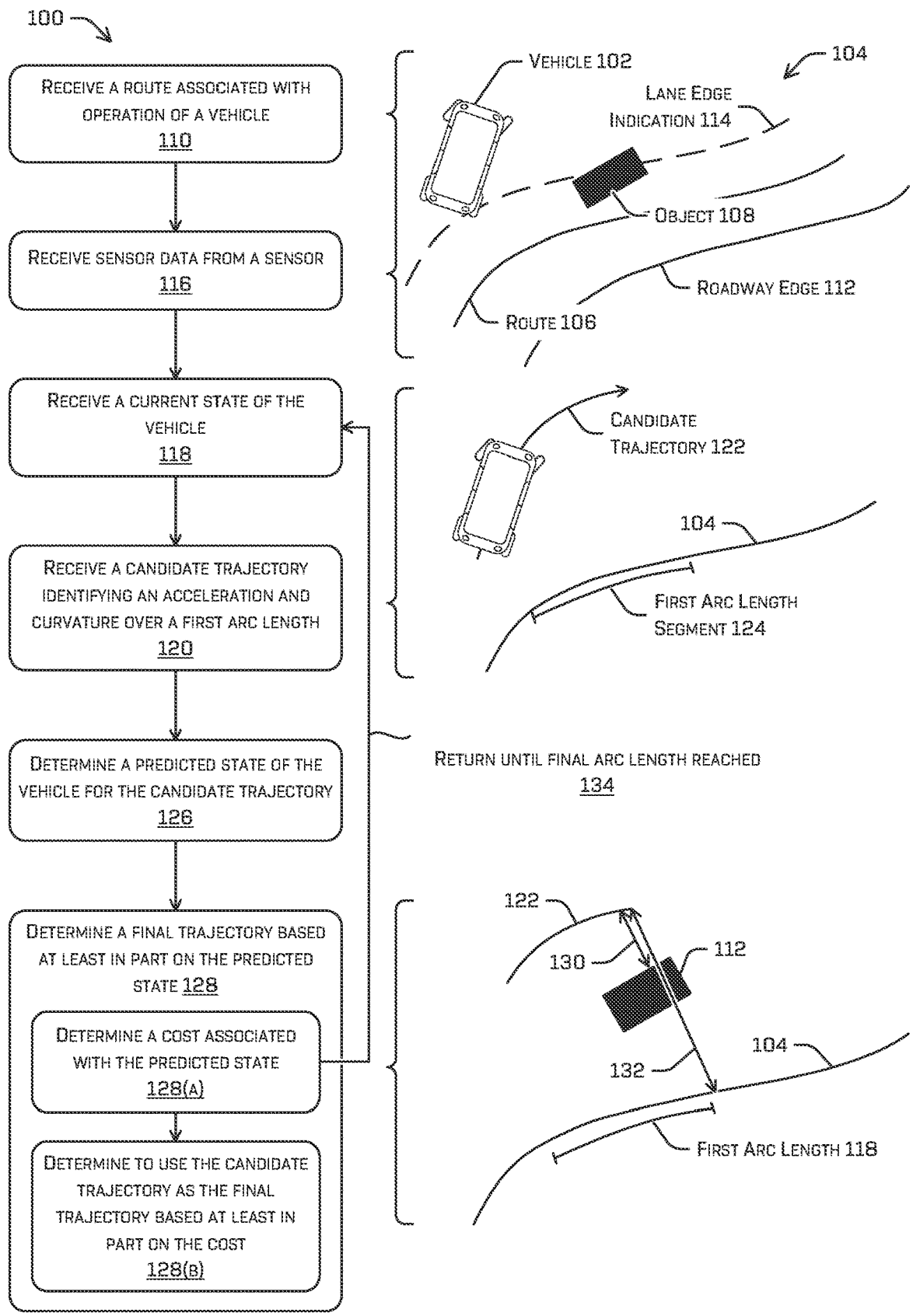
FIG. 1 illustrates a pictorial flow diagram of an example process that a planning component of an autonomous vehicle may use to determine, by a numerical integrator discussed herein, a final trajectory for controlling motion of the autonomous vehicle based at least in part on a route.

Techniques for determining and tracking a trajectory for controlling a vehicle are discussed herein. As used herein, a second-order trajectory may define a target position, velocity, and/or acceleration that a controller of the vehicle may use to send instructions to a drive system of the vehicle to track the trajectory. For example, the instructions generated by the controller to track the trajectory may include a steering angle, steering rate, and/or an amplitude or velocity to be applied to wheels of the vehicle. Tracking such a trajectory may include modifying instructions sent to the drive system sufficient to accomplish the target steering angle, etc. Without knowledge of how the vehicle will respond to such controls, controlling a vehicle can become unstable. Further, accurate determination of the response may be required for determining associated values, such as costs for example, when evaluating whether to follow such trajectories.

In some examples, the techniques discussed herein may include an integrator (e.g., a numerical integrator) for a second-order kinematic vehicle model defined in a route-relative frame, which can be employed for decision and motion planning of autonomous vehicles. In other words, the trajectory determined according to the techniques discussed herein may be determined based at least in part on a predicted state of the vehicle responsive to controls applied to the vehicle relative to a route. The route may define a path the vehicle is to follow, such as to accomplish a mission. For example, the route may identify a road, a lane, portion of a lane, and/or a lateral position relative to a roadway edge (such as where lane markers are not available) for accomplishing a mission, such as dropping off or picking up a passenger at a location. In some examples, the route may identify a center of a lane, although in additional or alternate examples this may not always be the case, such as on curved roadways, when obstacles exist, and/or when a hazard is present on one side of the roadway.

To further explain a route-relative frame, the trajectory and/or state of the vehicle may be represented relative to this route. For example, the trajectory may define a current pose (e.g., position and/or orientation (which, for example, in the case of rigid bodies may be expressed in the form of two degrees of freedom in two dimensions (e.g., lateral offset from the route and angular orientation), six degrees of freedom in three dimensions, or otherwise)) of the vehicle relative to a pose associated with the route. The route may define a route pose, i.e., a position and/or orientation of a point tangential to the route along a route and the current pose may identify a current pose in coordinates that are relative to the route pose. The trajectory (or controls applied to the vehicle) may identify a target pose (which may additionally or alternatively represented as a curvature) and/or acceleration for the autonomous vehicle at a time step in the future for the vehicle to accomplish and this trajectory may be represented in coordinates that are relative to the route (e.g., a displacement along the route, a lateral offset (i.e., distance) from the route, a heading offset from the route, a curvature). The trajectory may additionally identify a velocity and/or acceleration that the vehicle is to target at that future time and pose. Importantly, while a vehicle may be commanded, for example, to follow a route, obstacles, control errors, etc. may cause the vehicle to diverge from the route. In such cases, the numerical integration methods described herein become necessary to evaluate motion of the vehicle despite complex relationships to the curve.

For the vehicle to move from a current state (i.e., current pose and velocity) to a future pose and velocity at a future time (collectively a "final state"), a planning component of the vehicle may predict the state that would result from a candidate trajectory (e.g., defined at least by a curvature and acceleration), i.e., a predicted state relative to the route (e.g., by performing approximation methods or simplistic propagations). The planning component may use this predicted state to determine the actual trajectory implemented by the vehicle. There may be various constraints upon the vehicle, such as a maximum possible steering angle; a maximum velocity of on the vehicle (e.g., legally and/or physically); a maximum acceleration and/or jerk (e.g., physically and/or imposed upon the vehicle for the sake of passenger comfort); and/or the like that the planning component is constrained to abide by. The integrator, in turn, may include hardware and/or software of a planning component that may determine the predicted state of the vehicle, given a current state of the vehicle, a candidate trajectory (controls), and a route.

In some examples, the predicted state determined by the integrator may be used to determine a final trajectory (i.e., the trajectory determined by the vehicle to control the vehicle—this determination may be subsequently modified based at least in part on a change of environmental or vehicle states) implemented by the vehicle. For example, the predicted state may be used by the planning component to determine a cost associated with a candidate trajectory and the planning component may select a candidate trajectory for implementation that is associated with a minimum cost and/or a cost below a threshold cost. In some examples, a candidate trajectory may be associated with multiple time steps (e.g., 100 millisecond increments, 500 millisecond increments, 1 second increments, any other time increment) up to a time horizon (e.g., 2 seconds, 5 seconds, 10 seconds, any other time) and the integrator may determine a predicted state for each time step based at least in part on the respective portion of the candidate trajectory. A cost may be determined for each predicted state and each of the costs may be added together to form a total cost associated with the candidate trajectory. This total cost may be used by the planning component to determine a final trajectory that reduces the total cost (e.g., to a total cost below a threshold, to a minimum cost).

Determining a cost associated with a predicted state may be based at least in part on determining one or more sub-costs. For example, the sub-costs may include a cost associated with deviation from the route, a lateral acceleration cost, a cost based at least in part on a proximity to an object in the environment (detected using sensor data), a cost for the jerk associated with the candidate trajectory, and/or the like. See U.S. patent application Ser. No. 17/394,334, filed Aug. 4, 2021, the entirety of which is incorporated herein by reference.

Unlike standard numerical ordinary differential equation (ODE) solution methods, the proposed integrator may have no approximation error, may avoid singularities typical for route-frame integration, and may be simple and efficient to implement. For example, former integration methods may fail or exhibit instability when:
 (1) a road segment has a high curvature and the vehicle's lateral offset from the route exceeds a turning radius of the road, thereby causing the vehicle's state to not properly map to the route;
 (2) there is a zero velocity state along the route (e.g., when the route also specified velocities and/or accelerations to be accomplish by the vehicle, as determined by a planning component of the vehicle based at least in part on sensor data and/or perception data); and/or
 (3) the vehicle orientation is close to perpendicular to the route tangent.

The integrator discussed herein can be evaluated through open-loop simulations and/or optimal control through least-squares trajectory optimization. Based on empirical comparison with other integrators, it can be shown that the disclosed integrator is robust to the edge-cases discussed above, such as route-frame mapping singularities, zero velocities, and/or extreme vehicle orientations. The disclosed integrator is also more robust to varied choices of initial guesses for the optimization, allowing the initial guess to be more loosely calculated and preventing a poor guess from jettisoning the validity of the trajectory. Thus, the proposed techniques can be a reliable choice for real-time autonomous vehicle planning and control applications. The techniques discussed herein may include a backstepping controller that may conduct a reference-tracking controller-based initialization of the optimization to increase the accuracy of the initial guess for initializing the optimization. This controller-based initialization may be based at least in part on the route curvature, a velocity of the vehicle, and/or a lateral offset of the vehicle from the route.

Although discussed in the context of determining a trajectory above, the techniques described herein are not meant to be so limiting. For instance, the techniques may be utilized when determining a portion of a lane or other portion of a drivable surface to use as a reference for controlling the vehicle when planning an overall path from a first location to a second location along a map. In such examples, a curve of a road segment may be used as the route as the vehicle traversing the segment is offset from that curve. Though control inputs from the vehicle may not be used, such controls may be replaced with waypoints along a lane. Outputs of such integration may, in turn, be used to select between lane segments when planning such a path.

The techniques discussed herein allow the planning component to determine a numerical solution, rather than an analytical solution, to the integration using the route, even though the vehicle may be offset from the route. This may simplify determination of the trajectory for controlling the vehicle, thereby reducing the computational load for determining a trajectory for controlling the vehicle, memory and/or hardware occupied by the integrator, and/or debugging complexity. In particular, the integrator may use a rotation matrix that identifies a change in rotation from a current point along a route to a future point along the route to determine a rotation, in route-relative coordinates, that the vehicle is to accomplish to reach a final state. This determination may be simplified, as discussed further herein, when the curvature of the route is below a threshold curvature, and may use a nominal (according to the techniques outlined below) method for determining the route-relative trajectory. Of note, such integration may be based on the relative rotation of the route itself from a current length along the route to a final length along the route.

The techniques discussed herein may increase the reliability of the planning component to generate a valid trajectory—e.g., a trajectory that the vehicle is able to accomplish, given its physical and/or legal constraints. This may increase the safety of the vehicle and decrease stops, hesitations, or decelerations by the vehicle as it falls back to other behaviors or transmits a request for assistance to a remote computing device due to an invalid trajectory. Furthermore, the techniques increase capabilities of the planning component to determine trajectories for edge cases where other techniques would have to rely on a different solution or would simply fail. For example, the planning component is able to generate valid trajectories for high curvature roadways, is robust to initialization errors, can generate trajectories that include coming to a stop (whereas other techniques cannot and would need to rely on a separate system or process), and/or may handle perpendicular or near-perpendicular vehicle orientations.

Example Process

FIG. 1 illustrates a pictorial flow diagram of an example process 100 for determining a trajectory for controlling an autonomous vehicle 102. FIG. 1 also depicts an example scenario in which such an autonomous vehicle 102 has deviated from a route 106 to avoid an object 108 that the vehicle 102 has detected using sensor(s) associated with the vehicle 102. Note that the discussion below references FIG.

Figure 2:
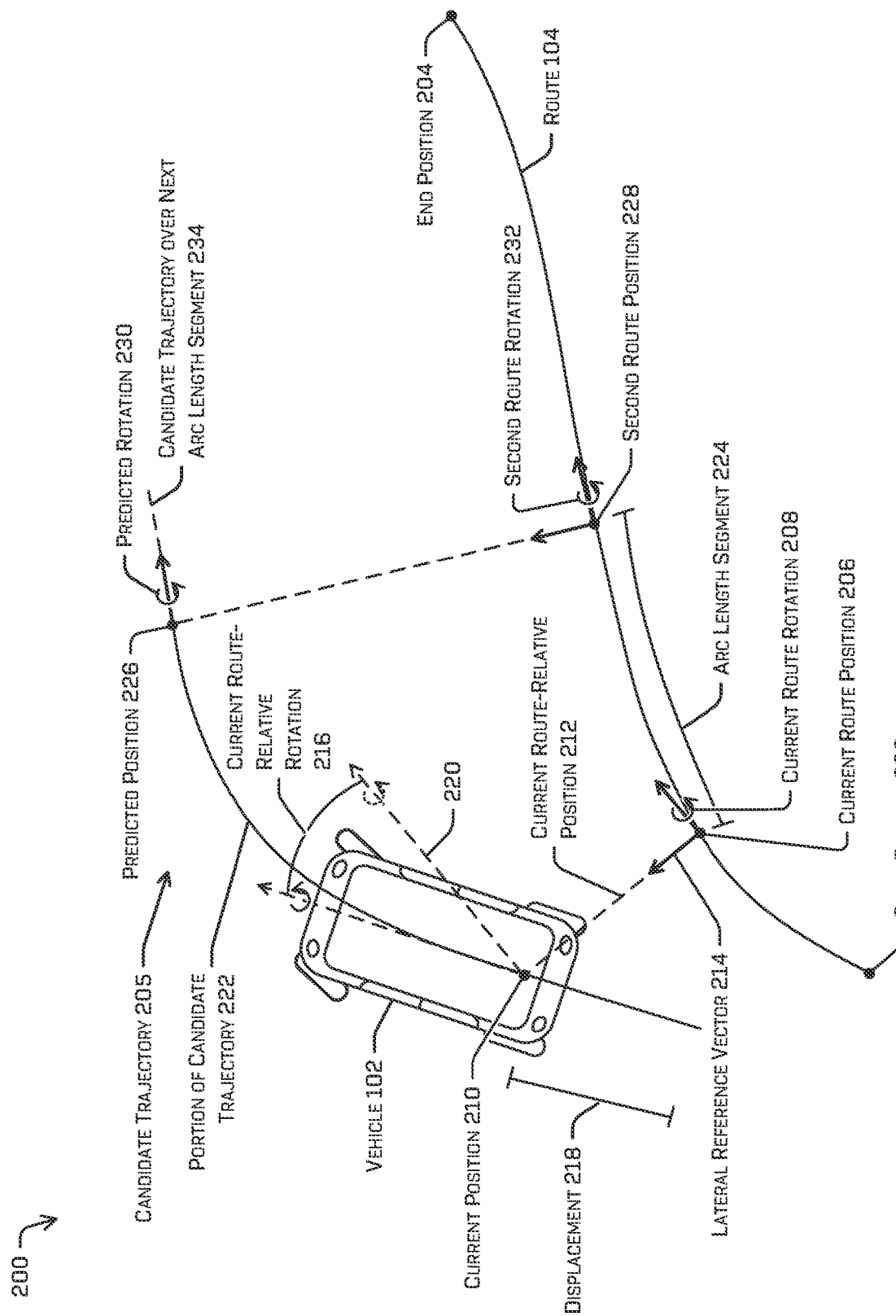
FIG. 2 depicts an example scenario including a candidate trajectory for controlling a vehicle relative to a route, in accordance with examples of the disclosure.

2 periodically, where the depiction in FIG. 2 would be more clear. Note that, as above, although the techniques discussed herein are described with respect to trajectory generation using a state associated with a vehicle and a route defined by a lane reference, it should be understood that the techniques presented herein may be equally used to generate a lane reference using a roadway edge as the route and the lane reference being generated as the state. For instance, the integration may be made such that lanes demarcated in a road network/map are used in place of the route reference and waypoints are used in place of controls (e.g., acceleration and/or steering/curvature). In such examples, the output of evaluating the integrated path may be a lane reference used as the route in subsequent trajectory exploration as described in further detail herein.

In some examples, the example scenario may be a real-world scenario and/or the example scenario may be a representation of a real-world scenario modeled as a simulated scenario. In examples where the example scenario is a simulated scenario, the example scenario may be determined based at least in part on input received at a user interface of a computing device (e.g., a user of the computing device may define the environment, objects therein, and/or characteristics thereof) and/or the example scenario may be based at least in part on log data received from one or more autonomous vehicles. The log data may be based at least in part on sensor data received at an autonomous vehicle, perception data generated by a perception component, and/or instructions generated by a planning component. In some examples, the autonomous vehicle may store the log data and/or periodically transmit the log data to a remote computing device.

In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like. In some examples, vehicle 102 may be represented in a simulation as a simulated vehicle. For simplicity, the discussion herein does not distinguish between a simulated vehicle and a real-world vehicle. References to a "vehicle" may therefore reference a simulated and/or a real-world vehicle.

At operation 110, example process 100 may include receiving a route 106 associated with operation of a vehicle 102. The route 106 may identify a path in an environment associated with the vehicle 102 from a start position to an end position. In some examples, the route may identify a reference path that the vehicle 102 is designed to track. The reference path may identify a lane, location within a lane, roadway, or the like for the vehicle to track, i.e., determine a trajectory that is close to the route, subject to various constraints, such as avoiding any detected objects, conforming to legal limitations, conforming to physical limitations of the vehicle 102, and/or the like. In some examples, the route may identify a center of the line, although in additional or alternate examples, the route may identify a location within a lane that is safer, more efficient, or the like for the vehicle 102, such as based on a location of a roadway edge 112 and/or a lane edge indication 114.

In some examples, the route may identify a curve parameterized using route arc length. In other words, the route from a start position at arc length $s_0$ to a final position at arc length $s_f$ may be a curve in SE(3) space over $[s_o, s_f]$. Of course, other representations are contemplated (e.g., SO(2), SE(2), SO(3)). A discrete location on such a curve may identify a pose, which may identify a position and rotation matrix, i.e., $g_r(\bullet)=(R_r(\bullet),p_r(\bullet))$, where $g_r$ is the route pose at a particular arc length, $R_r$ is the route rotation matrix at a particular arc length and $p_r$ is the route position at a particular arc length. In some instances, the segment defined by the desired curvature can be a motion primitive generated in accordance with the techniques discussed in U.S. patent application Ser. No. 15/843,596, filed Dec. 15, 2017. Further, the segment defined by the desired curvature 124 can be generated in accordance with the techniques discussed in U.S. patent application Ser. No. 15/843,512, filed Dec. 15, 2017. Additional techniques for generating a trajectory are discussed in U.S. patent application Ser. No. 16/147,492, filed Sep. 28, 2018. Application Ser. Nos. 15/843,596, 15/843,512, and 16/147,492 are herein incorporated by reference, in their entirety, and for all purposes.

At operation 116, example process 100 may comprise receiving sensor data from a sensor associated with the vehicle 102. According to the techniques discussed herein and an example where scenario is a real-world example (or is based on a real world scenario, such as by being based on log data), the vehicle 102 may receive sensor data from sensor(s) associated with the vehicle 102. For example, the sensor(s) may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, and/or other depth-sensing sensor), an image sensor (e.g., a camera), an audio sensor (e.g., a microphone), and/or environmental sensor (e.g., a barometer, a hygrometer, etc.). In some examples, the sensor(s) may be used to detect object(s) in the environment and/or to determine a current state of the vehicle 102. For example, in the depicted example, a perception component of the vehicle 102 may determine, based at least in part on the sensor data, that an object 108 exists in the environment and is blocking part of the roadway in which the vehicle 102 was operating.

At operation 118, example process 100 may comprise receiving a current state of the vehicle. In some examples, the current state may be associated with an N-th iteration of the integrator and/or an N-th arc length segment, where N is a positive integer. In other words, "current" may be current in regards to an execution of the iterator. Where N=0, the current state may be current for the system as a whole—in other words, N=0 may be associated with most recently received sensor data/and a state of the broader vehicle systems. In some examples, the N=0 current state may include an initial estimate by the perception component and/or the planning component of the current state of the vehicle, such as based on GPS data, a simultaneous localization and mapping (SLAM) technique using the sensor data, based on a previous portion of the route, based on a previous execution of the route, or the like.

Regardless, the planning component and/or perception component of the vehicle 102 may determine a current state of the vehicle 102 in route-relative terms as a function of arc-length. The current state at an i-th arc length segment, $x_i$, may comprise a route-relative pose, $\bar{g}_i$, and a velocity of the vehicle in a vehicle system frame of reference, $v_i$. Note that route-relative means in coordinates specified with respect to a corresponding route characteristic. For example, the route-relative pose of the vehicle, $\bar{g}_i(s_i)$, at an i-th arc length, may be represented with reference to the route pose, $g_r(s_i)$, associated with the i-th arc length.

At operation 120, example process 100 may comprise receiving a candidate trajectory identifying an acceleration and curvature over a first arc length of the route. In some examples, an upstream component of the planning component may determine the candidate trajectory, based at least in part on the sensor data and/or the current state of the vehicle 102. The candidate trajectory may identify a curvature for the vehicle to track and an acceleration. In some examples, the acceleration may be assumed to be constant for an arc length segment over which the integrator integrates, so long as the segments are short enough that the integrator remains exact/error-free. Smoother controls can be used by averaging the acceleration and curvature over the segment, but the integrator will no longer be exact, which is an acceptable trade-off in some examples. For example, the controls/trajectory for an arc length interval, $[s_i, s_{i+1}]$, may be represented as $u([s_i, s_{i+1}])=(\kappa, a)$, a curvature (and/or steering angle), $\kappa$, and acceleration (or torque), $a$. For smoother controls, the following may be used by averaging over the arc length interval:

$$a = \frac{a(s_i) + a(s_{i+1})}{2}, \kappa = \frac{\kappa(s_i) + \kappa(s_{i+1}) +}{2} \quad (1)$$

where $\kappa(s_i)$ is the (target) curvature at an i-th arc length and a is the (target) acceleration at an i-th arc length.

For the first arc length segment, an exact route-relative state of the vehicle may not yet be known, in some examples, so the planning component may determine estimated controls for the first state of the vehicle (for the N=0 case) based at least in part on an initialization of controls/trajectory provided to the vehicle 102. For example, the initialization may include determining a trajectory acceleration and/or curvature (e.g., steering angle) for controlling the vehicle 102 given a current estimated position, orientation, and/or velocity of the vehicle and may comprise tracking the route to minimize deviation from the curve defined by the route and a velocity profile specified by a trajectory, i.e., the acceleration controls specified by the trajectory. In at least some examples, obstacle avoidance may also be considered. For example, determining the initial trajectory/controls may include determining a curve (i.e., positions over arc length) and acceleration for the vehicle at a particular arc length by determining:

$$\kappa(s) = \tilde{\kappa}(s) - \frac{[1 + k_1 k_2]\bar{p}(s) + [k_1 + k_2]v(s)\sin\bar{\theta}(s)}{v(s)^2\cos\bar{\theta}(s)} \quad (2)$$

and $$a(s) = k_3[\tilde{v}(s) - v(s)] \quad (3)$$

where $\kappa(s)$ is the curvature as a function of arc length and the tilde represents the reference curvature (e.g., identified by the trajectory/controls), $\bar{p}(s)$ is the position of the vehicle relative to the route (where the bar herein signifies route-relativity) as a function of arc length (or length along the route), $\bar{\theta}(s)$ is the heading of the vehicle as a function of arc length, and $k_{1,2,3}$ are gains greater than zero (e.g., $k_1$ may be 1 or any other positive number, $k_2$ may be 3 or any other positive number, $k_3$ may be 0.25 or any other positive number). This initial trajectory may ignore collocating with another object since the techniques discussed herein will stabilize the system almost immediately and avoid any obstacles and since the vehicle is presumably not collocated with another object at N=0.

FIG. 1 depicts a candidate trajectory 122 specifying a curvature and acceleration for the vehicle 102 for the first arc length segment 124 and with reference to the route 104.

At operation 126, example process 100 comprises determining a predicted state of the vehicle for the candidate trajectory. The integrator discussed herein may determine this predicted state. The predicted state may be used to iteratively generate the controls/candidate trajectory. The predicted state may comprise at least a predicted pose and predicted velocity, $x_{i+1}$, of the vehicle that will result from applying the controls/candidate trajectory, $u([s_i, s_{i+1}])$, to the current pose of the vehicle, $x_i=(\bar{g}_i, v_i)$ over the arc length segment, all with respect to the route pose over the arc length segment, $g_r([s_i, s_{i+1}])$. In other words, the integrator computes the next pose, $x_{i+1}$, at specified route arc-length, $s_{i+1}$, as a result of applying control signal $u(s)=(\kappa(s), a(s))$, to the vehicle over the interval $[s_i, s_{i+1}]$. The integrator, I, then may be given by $$x_{i+1} = I(x_i, u([s_i, s_{i+1}]); g_r([s_i, s_{i+1}])) = (\bar{g}_{i+1} = (\bar{R}_{i+1}, \bar{p}_{y_{i+1}}), v_{i+1}) \quad (4)$$

where the predicted state is route-relative. For example, the predicted state includes a predicted route relative pose composed of a route-relative predicted rotation matrix (e.g., identifying the six degrees of freedom rotation of the vehicle in SE(3)) and route-relative lateral position of the vehicle, and the predicted velocity of the vehicle, which may be a velocity relative to a system/body frame.

At operation 128, example process 100 may comprise determining a final trajectory for controlling the vehicle based at least in part on the predicted state. For example, the integrator may be used to incrementally test, search for, or determine segments of the candidate trajectory. See U.S. patent application Ser. No. 17/394,334, filed Aug. 4, 2021, the entirety of which is incorporated by reference herein, for details regarding incrementally enumerating different trajectories. Additionally or alternatively, a segment of the candidate trajectory may be determined by optimizing the candidate trajectory segment for a cost determined according to the techniques discussed herein. For example, operation 128 may include operation 128(a) and/or operation 128(b).

At operation 128(a), example process 100 may comprise determining a cost associated with the predicted state. The cost associated with the predicted state may be a sub-cost associated with a segment of the candidate trajectory that may be summed with other sub-costs associated with different segment(s) of the candidate trajectory. For example, the total candidate trajectory may be associated with a total arc length and each arc length segment may be associated with a different predicted state and different sub-cost, which may be totaled to determine a total cost associated with the candidate trajectory (all of its segments).

In some examples, determining the cost (e.g., a sub-cost) associated with a predicted state of the vehicle may be based at least in part on a distance 130 of the predicted state to a closest object, a jerk associated with the predicted state (e.g., a jerk that nears or is above a jerk threshold may incur a higher cost), a deviation 132 of the predicted state from the route 104 (e.g., the deviation may include a lateral distance of the predicted position from a corresponding point on the route associated with the arc length, a difference between the predicted rotation matrix and the route rotation matrix associated with the arc length, and/or a difference between a velocity associated with the route and a predicted velocity), and/or a lateral acceleration cost. Any other costs may additionally or alternatively used. For example, see U.S. patent application Ser. No. 17/394,334, filed Aug. 4, 2021.

Depending on the implementation, if the current (i-th) arc length is not the last arc length of the candidate trajectory, process 100 may return (according to operation 134) to operation 118 and use the predicted state as the new current state for a next iteration of operations 18, 120, 126, and 128(a). In such an example, the current state of the next iteration will be the predicted state of this iteration, the next candidate trajectory generated will be associated with a next arc length segment, etc. This process may be repeated until a final arc length is reached. The final arc length may be associated with a time horizon and the arc length may thereby be dependent upon a speed of the vehicle, the final arc length may be associated with an end position of the route 104, and/or the final arc length may be associated with a static arc length (e.g., 2 meters, 10 meters, 20 meters, any other number). In an additional or alternate example, if the cost or a running total of costs meets or exceeds a cost threshold, the example process 100 may abandon the current candidate trajectory and start over with a new candidate trajectory at the first arc length. This may be useful if the running total of costs meets or exceeds the total cost of a previously explored candidate trajectory or would be unable to have a lower cost than the cost of a previously explored candidate trajectory.

At operation 128(a), example process 100 may comprise determining to alter the candidate trajectory to reduce the cost or determining to use the candidate trajectory as the final trajectory based at least in part on the cost. In some examples, operation 128(a) may be an alternative to immediately proceeding to a next arc length segment to explore a next candidate trajectory—in addition or instead, the example process 100 may modify the candidate trajectory, return to operation 126 to re-determine a predicted state associated with the modified candidate trajectory, and determine a new cost associated with the current arc length segment. In such an example, once a number of iterations have been reached, once a cost is found below a cost threshold, or a cost is found that is less than one or m number of candidate trajectories (where m is a positive integer), example process 100 may continue to the next arc length segment until a final arc length is reached.

In an additional or alternate example, operation 128(b) may be executed based at least in part on determining one or more complete candidate trajectories, each of which may have a total cost determined in association therewith. In such an instance, operation 128(b) may include determining a candidate trajectory associated with a lowest total cost among the candidate trajectories and total costs and/or determining a candidate trajectory associated with a total cost that is below a cost threshold.

Regardless of which example is used (they may be combined in one example), at operation 128(b), example process 100 may determine a final trajectory for implementation by the vehicle, which may include generating instructions for actuating a drive system of the vehicle 102 to cause the vehicle 102 to move.

Example Scenario

FIG. 2 depicts an example scenario 200 including a vehicle 102, a route 104, and a candidate trajectory 205 (e.g., comprising a portion of the candidate trajectory 222), in accordance with examples of the disclosure. FIG. 2 depicts multiple current and predicted vehicle states, initial and future known route characteristics, and current and future trajectory characteristics so that the integrator operations discussed further below may be more easily understood.

The route 104 may be received from an upstream component of the planning component. Such a component may determine the route based at least in part on a map, a start position and an end position in an environment. The depicted start position 202 and end position 204 may be a portion of that route. For example, the depicted start position 202 and end position 204 may be associated with controlling the vehicle 102 over a time horizon and/or for an arc length interval, $[s_0, s_f]$. As used above, the word current may refer to a time at which most-recently received sensor data was received and/or perception data was generated therefor, i.e., a vehicle computing system most-recent updated state. In some examples, the word current may also refer to an i-th iteration of predicted state determination and/or candidate trajectory generation, wherein i is a positive integer.

The route may identify a curve over the start position to end position parameterized using arc length in a special Euclidean group (i.e., $g_r:[s_0,s_f] \rightarrow SE(3)$) that may be decomposed into constituent poses. For example, at an i-th arc length along the curve defined by the route, a current route pose, $g_r(s_i)$, may identify a current route position 206 and a current route rotation 208, i.e., $g_r(s_i)=(R_r(s_i),p_r(s_i))$ where $R_r$ may be a rotation matrix in the 3D rotation group (i.e., $R_r \in SO(3)$)—the choice of rotation need not depend on the position curve $p_r$—that is longitudinally aligned with the tangent, i.e., $R_r(\bullet)e_1=p'_r(\bullet)$ (where $e_1=(1,0,0)$ is the longitudinal basis vector for the $SO(3)$) and $p_r$ is a position curve that defines the position of the route in three-dimensional Euclidean space. In essence, the rotation matrix identifies an orientation of the vehicle in six degrees of freedom in three-dimensional Euclidean space mapped to an orthonormal basis defined by the position. In other words, the rotation matrix may identify an orientation of the vehicle about the position parameterized in arc length.

The discussion herein includes an integrator that uses a route-relative frame of reference for determining predicted state(s) of the vehicle 102, meaning that a pose of the vehicle 102 may be mapped/projected onto the route. In other words, there is a corresponding pose of the route. For example, a pose comprises a position and orientation (rotation), so a current position 210 of the vehicle may be mapped to a position identified by the route, i.e., the current route position 206. In three dimensions, determining a route-relative position 212, $\bar{p}(s)$ of the vehicle 102 may include determining two lateral elements, $\bar{p}_y$ and $\bar{p}_z$ in some cases, since the longitudinal route-relative element of position, $\bar{p}_x$, is always 0 since the route-relative position results from an orthogonal projection onto the route. The route-relative position can therefore be given by $\bar{p}(s)=(0,\bar{p}_y(s),\bar{p}_z(s))$. It may be assumed, for a simple vehicle model, which works for the majority of use cases (e.g., unless a vehicle is rock-crawling or on otherwise very uneven terrain other than a roadway), that the vertical route-relative position $\bar{p}_z$, is trivial and can also be treated as zero. The route-relative position 212 can therefore be determined as the lateral offset of the current position 210 from a nearest position defined by the route 104. For this reason, FIG. 2 depicts route-relative positions as lateral offsets from the route 104. Note that a lateral offset can be defined as the distance along a lateral reference vector 214, which may be the corresponding lateral component of the route rotation at a closest position and corresponding arc length on the route 104—i.e., an orthonormal basis vector $e_2$ modified by the particular rotation at that arc length.

The state of the vehicle may, in addition to the route-relative position of the vehicle, include a velocity of the vehicle, $v_r(s)$ (which may be a body-fixed longitudinal velocity), a difference in heading than a heading identified by the route (i.e., a route-relative rotation of the vehicle), $\overline{R}_r(s)$, and/or a displacement of the vehicle, $\Delta l$ (e.g., an arc length traveled so far by the vehicle). Note that the velocity of the vehicle discussed herein is given in a body/vehicle-relative frame. For example, for a current, i-th, vehicle state, the current state may include the current route-relative position 212, a current route-relative rotation 216, a body-referenced velocity, and/or a displacement 218 of the vehicle 102 (which may be an arc length). FIG. 2 includes a representation of the current route rotation 208 translated to the current position 210 to depict a representation of the current route-relative rotation 216. Note that the depictions of rotations in the figures lack multiple dimensions that may be indicated in the respective rotation matrices of the route rotation ($R_r$), the vehicle rotation ($R$), and the current route-relative rotation ($\overline{R}$).

The planning component may use the route defining a curve, as discussed above, with length $s_f$ to determine a sequence of target states, $\tilde{x}_0, \ldots, \tilde{x}_N$ at intervals $$\Delta s = \frac{s_f}{N}$$

(i.e., the arc length segment length). These target states may be based at least in part on sensor data and various constraints (e.g., physical vehicle constraints, legal constraints, lateral acceleration constraints, jerk constraints). In some examples, this sequence of target states need not be feasible or smooth. The planning component may determine a trajectory that specifies controls for each of these target states, which can be denoted by $\tilde{u}_0, \ldots, \tilde{u}_{N-1}$. FIG. 2 depicts a portion of such a candidate trajectory 222 for controlling the vehicle 102 over an i-th arc length segment 224, i.e., controls, $\tilde{u}_i$, for transitioning the vehicle from a current state $x_i$ to a target state (and/or next state) at the end of the arc length interval/at a next arc length, $\tilde{x}_{i+1}$. In particular, the controls/trajectory may specify a curvature (and/or steering angle), K, and an acceleration, a, for transitioning the vehicle from the current state to the target state. The interval $\Delta s$ may be chosen to be sufficiently small that the curvature and acceleration can be held constant for an i-th interval, $\Delta s_i$, while preserving the integrator's exactness/low or no error determinations.

The integrator discussed herein may receive the route-relative pose and velocity of the current state of the vehicle 102, the controls for the current (i-th) arc length segment, and the route, and may determine a predicted state of the vehicle at the next, i+1, arc length. The predicted state may comprise a predicted route-relative pose and a body-frame velocity of the vehicle at a next arc length. Note that the next arc length may be associated with a future time for any positive arc lengths beyond $s_0$. Again, the predicted route-relative pose is based on a predicted position 226 of the vehicle (which is an unknown) relative to a second route position 228 (which is known and is the closest point on the route according to a lateral reference vector, i.e., tangent, from the route); and a predicted rotation 230 (unknown) of the vehicle relative to a second route rotation 232 (known and associated with the second route position 228). The predicted route-relative state that results from controls exerted on the vehicle over an i-th arc length (i.e., over the interval $[s_i, s_{i+1}]$) may be encoded as follows:

$$x_{i+1} = \psi(u_i) = (\overline{g}_{i+1} = (\overline{R}_{i+1}, \overline{p}_{i+1}), v_{i+1}) \quad (5)$$

where $\psi$ encodes the operations of the integrator discussed herein.

FIG. 2 also depicts the beginning of controls for a candidate trajectory over a next arc length segment 234.

Figure 3:
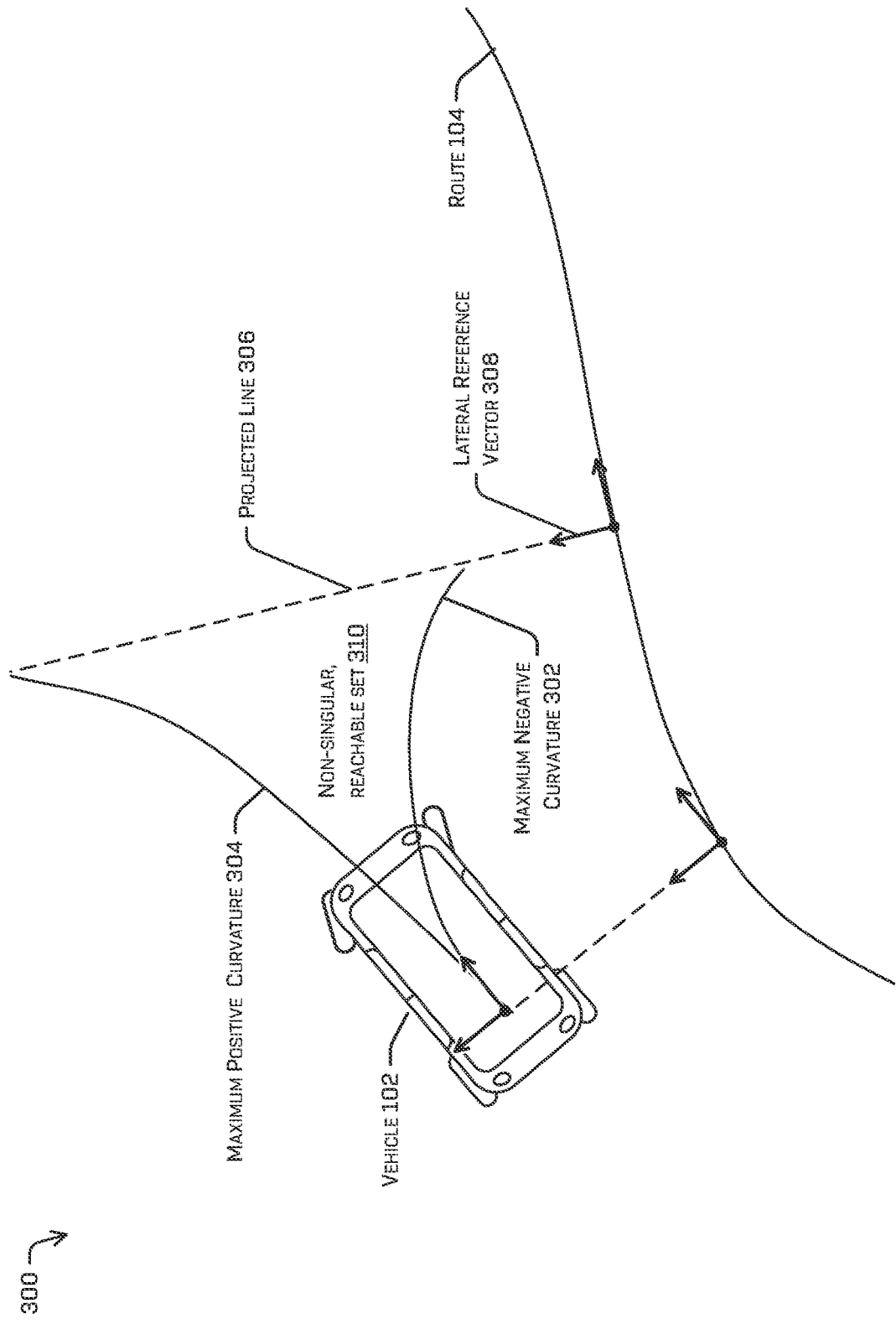
FIG. 3 depicts an example scenario for limiting curvature of controls provided to the vehicle to avoid singularity(ies) due to high curvature.

FIG. 3 depicts an example scenario 300 for limiting curvature of controls provided to the vehicle to avoid singularity (ies) due to high curvature. In some examples, the techniques discussed herein may comprise clamping a trajectory generated by the planner to $\kappa \in [\kappa^-, \kappa^+]$. Meaning that if the curvature specified by the candidate trajectory controls exceeds a maximum negative curvature 302, $\kappa^-$, the curvature of the trajectory is, instead, set to equal the maximum negative curvature. For example, if a trajectory specifies a curvature that is more curved to the right-hand side (from the vehicle 102 frame) than the maximum negative curvature 302, the curvature of the candidate trajectory to equal the maximum negative curvature 302. The maximum negative curvature 302 may be limited by the physical constraints of the vehicle—i.e., the vehicle's ability to turn. However, the maximum positive curvature 304 is constrained by ensuring there is a solution to the integrator discussed herein. To avoid this singularity, the maximum positive curvature 304 is determined to be the maximum curvature that conforms to the physical constraints of the vehicle and that also intersects a projection of a line 306 from the lateral reference vector 308, which may be defined as a portion of the route rotation at an arc length along the route that corresponds with a terminus of the arc length segment that the controls are associated with. Note that the maximum negative curvature 302 may also similarly be determined based at least in part on limiting the maximum negative curvature 302 to the lesser of a maximum physical curve achievable by the vehicle given the current state (e.g., which may take velocity, road conditions, etc. into account) and a maximum curvature that will intersect the line 306. Note that, together, the maximum negative curvature 302 and maximum positive curvature 304 define a non-singular set 310 of curve controls that are physical feasible for the vehicle to accomplish. In some examples, the candidate trajectory may be clamped before being provided to the integrator and/or an error message may be generated and transmitted to the planning component to re-select a new candidate trajectory for exploration. In an additional or alternate example, the candidate trajectory need not be modified by the integrator may clamp the candidate trajectory, as necessary, before executing, so as to avoid a failure by the integrator to generate a predicted state. The candidate trajectory does not need to be modified in such a situation.

Note that zero-velocity singularities can occur when updating the next velocity and the integrator discussed herein may avoid such singularities by requiring that:

$$v_i^2 + a\Delta l \geq 0 \quad (6)$$

which is equivalent to:

$$a \geq -\frac{\Delta l}{v_i^2} \quad (7)$$

This acceleration constraint is enforced as part of the integrator discussed herein, thereby avoiding a singularity caused by the existence of a zero velocity state.

Example Process

Figure 4:
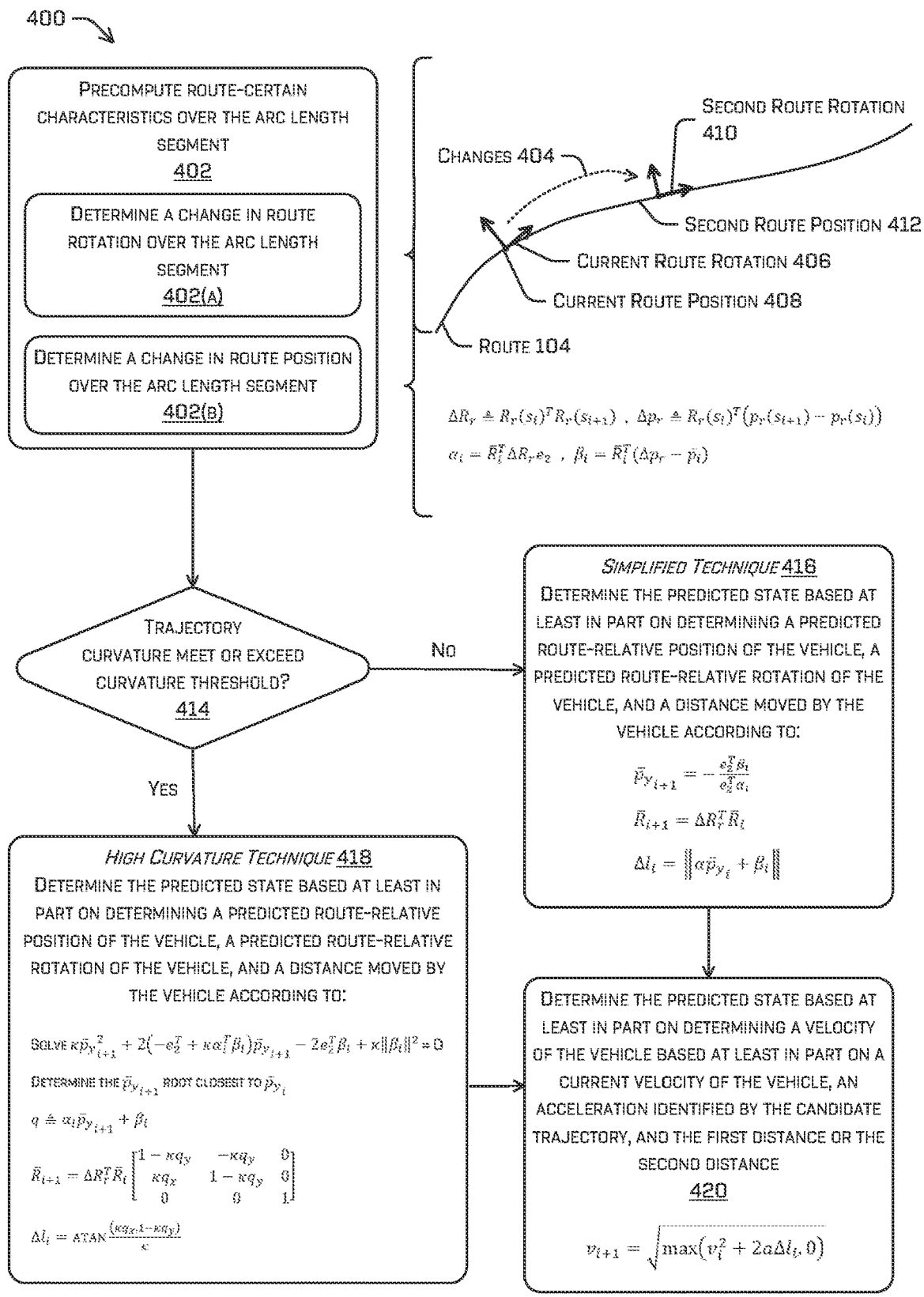
FIG. 4 illustrates a pictorial flow diagram of an example process for determining a predicted state of the vehicle based at least in part on a candidate trajectory and a route, the predicted state used to determine a trajectory for controlling the autonomous vehicle.

FIG. 4 illustrates a pictorial flow diagram of an example process 400 for determining a predicted state of the vehicle based at least in part on a candidate trajectory and a route 104. Example process 400 may be executed by a hardware and/or software integrator that may be part of the planning component of an autonomous vehicle. In some examples, the integrator may determine the predicted state discussed herein numerically (as opposed to analytically) and has been configured to do so using closed form operations with the exception of one trigonometric function. In some examples, example process 400 may be part of example process 100 for determining a final trajectory for controlling a vehicle. For example, example process 400 may be at least part of operation 126. However, although the techniques discussed herein are described with respect to trajectory generation using a state associated with a vehicle and a route defined by a lane reference, it should be understood that the techniques presented herein may be equally used to generate a lane reference using a roadway edge as the route and the lane reference being generated as the state. For instance, the integration may be made such that lanes demarcated in a road network/map are used in place of the route reference and waypoints are used in place of controls (e.g., acceleration and/or steering/curvature). In such examples, the output of evaluating the integrated path may be a lane reference used as the route in subsequent trajectory exploration as described in further detail herein.

Example process 400 may include receiving a current (i-th) state of the vehicle that may be estimated, for a first iteration or may be a previous predicted state from a previous iteration of the integrator. The current state may specify a route-relative pose of the vehicle, $\bar{g}_i$ and body-frame velocity, $v_i$, at $s_i$, the arc length at a beginning of the i-th arc length segment, $[s_i, s_{i+1}]$. The arc length may be chosen to be sufficiently small (e.g., 100 segments over 50 meters—i.e., a segment length of 0.5 meters; a segment length of 1 meter, 0.1 meters, 50 centimeters) so that the acceleration and curvature can be held constant (such as by averaging their values over the segment and using the resultant respective values) Example process 400 may additionally receive the controls/candidate trajectory for the arc segment, $u_i = (\kappa, a)$ and the route, $(g_r(\bullet))$, collectively:

$$\text{Receive}(\text{state}(\bar{g}_i, v_i), \text{controls}(\kappa, a), \text{route}(g_r(\bullet))) \quad (8)$$

Note that the notation assumes that the functions are parameterized by arc length.

At operation 402, example process 400 may include precomputing route-certain characteristics over the current (i-th) arc length segment, called a "first arc length" below. For example, there are portions of the integrator executions that can be executed before the current state or controls are taken into account. This allows the integrator to be used to iteratively generate and/or modify a candidate trajectory for the arc length segment, in some examples, with computational efficiency by not re-computing portions that are known and invariant.

These route-certain characteristics that may be used by the integrator in determining a predicted state of the vehicle responsive to the controls may include determining, at operation 402 (a), a change in route rotation over the arc length segment, $\Delta R_r$; and/or, at operation 402 (b), determining a change in route position over the arc length segment, $\Delta p_r$. These changes 404 are depicted as a transition between current route rotation 406 and current route position 408, and a second route rotation 410 and second route position 412, respectively. The second route rotation 410 and second route position 412 are associated with the arc length $s_{i+1}$. In particular, these changes may be determined by the integrator based at least in part on the current route rotation 406 at the current arc length/beginning of the arc length segment, $R_r(s_i)$; the second route rotation 410 at the next arc length/end of the arc length segment, $R_r(s_{i+1})$; the current route position 408 at the current arc length/beginning of the arc length segment, $p_r(s_i)$; and the second route position 412 at the next arc length/end of the arc length segment, $p_r(s_{i+1})$, as follows:

$$\Delta R_r \triangleq R_r(s_i)^T R_r(s_{i+1}) \quad (9)$$

$$\Delta p_r \triangleq R_r(s_i)^T (p_r(s_{i+1}) - p_r(s_i)) \quad (10)$$

The change in route rotation and change in route position may be used to further determine terms used in vehicle state and/or controls-dependent computations. These values may be pre-computed as well and include determining a transpose of the route-relative rotation matrix associated with the vehicle, $\bar{R}_i^T$, as follows:

$$\alpha_i = \bar{R}_i^T \Delta R_r e_2 \quad (11)$$

$$\beta_i = \bar{R}_i^T (\Delta p_r - \bar{p}_i) \quad (12)$$

where $e_2$ is the SO(3) basis vector $e_2 = (0,1,0)$, $\alpha$ includes a difference between the current route-relative rotation and the route rotation along the arc length segment; and $\beta$ includes a difference between the current route relative position and the route position over the arc length segment.

At operation 414, example process 400 may comprise determining whether a trajectory/controls curvature meets or exceeds a curvature threshold. The curvature threshold may be different than the maximum negative curvature and maximum positive curvature used to clamp trajectories. In some examples, the curvature threshold may be a very small number, such as $|\kappa| < 10^{-8}$ or any sufficiently small near-zero number. Essentially, as the curvature approaches zero, the rotation due to the curvature may be insignificant and the integrator may use a simplified technique at operation 416 when the curvature is less than the curvature threshold. If the curvature meets or exceeds the curvature threshold, example process 400 may continue to operation 418. In some examples, operation 414 avoids a singularity where $\kappa$ is in the denominator. Operations 414 and/or 416 may reduce computational use, particularly when the vehicle is on a straight or near-straight roadway. Operation 414 may functionally bifurcate the numerical integration into a first integration associated with a first range of curvatures and a second integration associated with a second range of curvatures, At operation 416, example process 400 may comprise determining a predicted state associated with the vehicle at a next arc length (e.g., at an endpoint of the current arc length segment) based at least in part on a simplified integration technique. The simplified technique may include determining a predicted route-relative position of the vehicle at the endpoint, a predicted route-relative rotation of the vehicle at the endpoint, and a distance moved by the vehicle over the arc length.

Determining the predicted route-relative position of the vehicle at the next arc length may be based at least in part on (as embedded in the α and β terms) the route-relative rotation of the vehicle, a change in route rotation over the length, a change in route position over the length, and the current route-relative position of the vehicle, as follows:

$$\bar{p}_{y_{i+1}} = -\frac{e_2^T \beta_i}{e_2^T \alpha_i} \quad (13)$$

where $e_2$ is the lateral basis vector.

Determining the predicted route-relative rotation of the vehicle at the next arc length/endpoint of the current arc length segment may be based at least in part on the interaction between the change in the route rotation and the current route-relative rotation of the vehicle, as follows:

$$\bar{R}_{i+1} = \Delta R_r^T \bar{R}_i \quad (14)$$

Determining a distance moved (i.e., displacement) by the vehicle over the arc length segment, relative to a vehicle frame, may be based at least in part on (as embedded in α and β and as determined at eq. 13) the predicted route-relative position, the current route-relative rotation of the vehicle, the change in route rotation over the length, the change in route position over the length, and the current route-relative position of the vehicle, as follows:

$$\Delta l_i = \|\alpha \bar{p}_{y_i} + \beta_i\| \quad (15)$$

In some examples, the displacement, Δl may be output as part of the predicted state, although in some other examples, it may be omitted from the predicted state and used internally for the integration component executions.

At operation 418, example process 400 may comprise determining a predicted state associated with the vehicle at a next arc length based at least in part on a technique for high curvature that avoids zero-velocity singularities. Determining the predicted state may include determining a predicted route-relative position of the vehicle at the endpoint, a predicted route-relative rotation of the vehicle at the endpoint, and a distance moved (i.e., displacement) by the vehicle over the arc length, as follows.

Determining a predicted route-relative position of the vehicle at the endpoint of the arc length segment may be based at least in part on determining a closest of two roots determined based at least in part on the curvature, current route-relative position of the vehicle, a current route-relative rotation of the vehicle, a change in route rotation over the length, and a change in route position over the length, by solving the following quadratic expression modeling vehicle position in route-relative coordinates over the arc length segment:

$$\kappa \bar{p}_{y_{i+1}}^2 + 2(-e_2^T + \kappa \alpha_i^T \beta_i) \bar{p}_{y_{i+1}} - 2e_2^T \beta_i + \kappa \|\beta_i\|^2 = 0 \quad (16)$$

Note that eq. 16 includes two roots and the root closest to the current position of the vehicle may maintain continuity and therefore be the correct predicted route-relative position.

Determining the predicted route-relative rotation of the vehicle at the endpoint may be based at least in part on the current route-relative rotation of the vehicle, the current rotation of the route, the curvature, the predicted route-relative rotation, and the acceleration specified by the candidate trajectory, as follows $$q \overset{\Delta}{=} \alpha_i \bar{p}_{y_{i+1}} + \beta_i \quad (17)$$

$$\bar{R}_{i+1} = \Delta R_r^T \bar{R}_i \begin{bmatrix} 1 - \kappa q_y & -\kappa q_y & 0 \\ \kappa q_x & 1 - \kappa q_y & 0 \\ 0 & 0 & 1 \end{bmatrix} \quad (18)$$

Determining a distance moved (i.e., displacement) by the vehicle over the arc length segment, relative to a vehicle frame, may be based at least in part on the curvature, the predicted route-relative position, the current route-relative position of the vehicle, the current route-relative rotation of the vehicle, and the change in route position, as follows (where the $q_x$ and $q_y$ components may be determined from eq. 17):

$$\Delta l_i = a \tan \frac{(\kappa q_x, 1 - \kappa q_y)}{\kappa} \quad (19)$$

Equation 19 includes the only trigonometric function of the integration, thereby allowing the integration function to be implemented in closed-form, allowing simple implementation of the integration component into hardware and/or software. For example, the integration component may be implemented as an application-specific integrated circuit (ASIC), a field-programmable gate array (FPGA), or the like, although it is understood that the integrator may alternately run on a graphics processing unit (GPU) as part of a trajectory determination (to take advantage of parallel processing capabilities of the GPU) or on a central processing unit (CPU).

At operation 420, example process 400 may comprise determining a predicted velocity of the vehicle at the endpoint based at least in part on a current velocity of the vehicle, the acceleration identified by the candidate trajectory, and the distance moved by the vehicle, as follows:

$$v_{i+1} = \sqrt{\max(v_i^2 + 2a\Delta l_i, 0)} \quad (20)$$

At this point, the predicted state may be output and may comprise the predicted pose, $\bar{g}_{i+1} = (\bar{R}_{i+1}, \bar{p}_{y_{i+1}})$ and the predicted velocity, $v_{i+1}$, although the displacement, $\Delta l_i$, may additionally be output as part of the predicted state.

In some examples, upon determining the predicted state, the predicted state and/or the candidate trajectory may be projected into a time parameterized space based at least in part on the velocity and/or acceleration, such that the predicted state identifies the predicted pose at a future time, the predicted velocity identifies the predicted velocity at a future time, and the displacement (if it is present as part of the predicted state) identifies the distance traveled by the vehicle at a particular future time.

Example System

Figure 5:
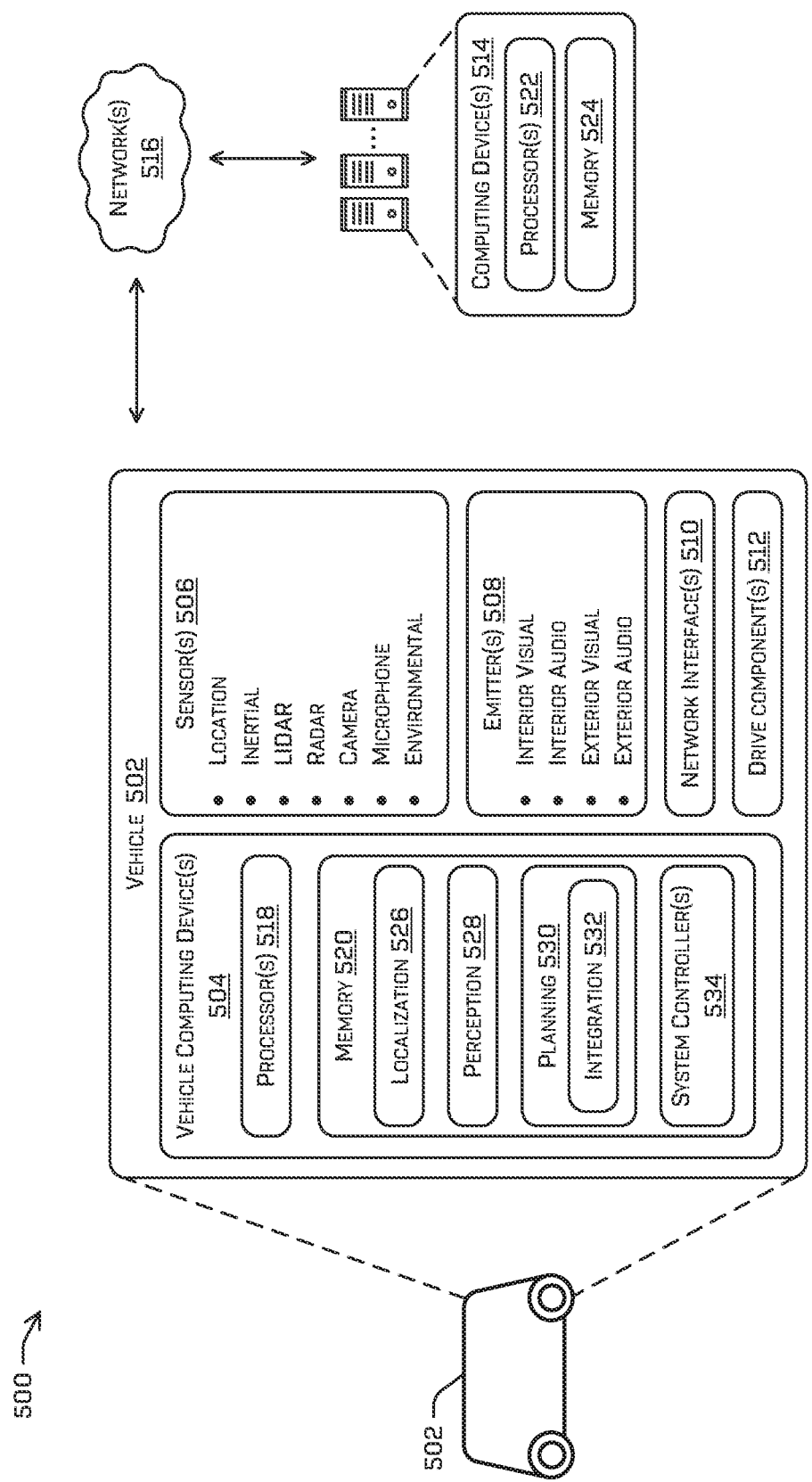
FIG. 5 illustrates a block diagram of an example autonomous vehicle architecture comprising a planning component and integrator for determining the predicted state and trajectory as discussed herein.

FIG. 5 illustrates a block diagram of an example system 500 that implements the techniques discussed herein. In some instances, the example system 500 may include a vehicle 502, which may represent the vehicle 102 in FIG. 1. In some instances, the vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 502 may be a fully or partially autonomous vehicle having any other level or classification. Moreover, in some instances, the techniques described herein may be usable by non-autonomous vehicles as well.

The vehicle 502 may include a vehicle computing device(s) 504, sensor(s) 506, emitter(s) 508, network interface(s) 510, and/or drive component(s) 512. The system 500 may additionally or alternatively comprise computing device(s) 514.

In some instances, the sensor(s) 506 may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 506 may include multiple instances of each of these or other types of sensors. For instance, the radar sensors may include individual radar sensors located at the corners, front, back, sides, and/or top of the vehicle 502. As another example, the cameras may include multiple cameras disposed at various locations about the exterior and/or interior of the vehicle 502. The sensor(s) 506 may provide input to the vehicle computing device(s) 504 and/or to computing device(s) 514. The position associated with a simulated sensor, as discussed herein, may correspond with a position and/or point of origination of a field of view of a sensor (e.g., a focal point) relative the vehicle 502 and/or a direction of motion of the vehicle 502.

The vehicle 502 may also include emitter(s) 508 for emitting light and/or sound, as described above. The emitter(s) 508 in this example may include interior audio and visual emitter(s) to communicate with passengers of the vehicle 502. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 508 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 502 may also include network interface(s) 510 that enable communication between the vehicle 502 and one or more other local or remote computing device(s). For instance, the network interface(s) 510 may facilitate communication with other local computing device(s) on the vehicle 502 and/or the drive component(s) 512. Also, the network interface(s) 510 may additionally or alternatively allow the vehicle to communicate with other nearby computing device(s) (e.g., other nearby vehicles, traffic signals, etc.). The network interface(s) 510 may additionally or alternatively enable the vehicle 502 to communicate with computing device(s) 514. In some examples, computing device(s) 514 may comprise one or more nodes of a distributed computing system (e.g., a cloud computing architecture).

The network interface(s) 510 may include physical and/or logical interfaces for connecting the vehicle computing device(s) 504 to another computing device or a network, such as network(s) 516. For example, the network interface(s) 510 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 504 and/or the sensor(s) 506 may send sensor data, via the network(s) 516, to the computing device(s) 514 at a particular frequency, after a lapse of a predetermined period of time, in near real-time, etc.

In some instances, the vehicle 502 may include one or more drive components 512. In some instances, the vehicle 502 may have a single drive component 512. In some instances, the drive component(s) 512 may include one or more sensors to detect conditions of the drive component(s) 512 and/or the surroundings of the vehicle 502. By way of example and not limitation, the sensor(s) of the drive component(s) 512 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 512. In some cases, the sensor(s) on the drive component(s) 512 may overlap or supplement corresponding systems of the vehicle 502 (e.g., sensor(s) 506).

The drive component(s) 512 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 512 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 512. Furthermore, the drive component(s) 512 may also include one or more communication connection(s) that enable communication by the respective drive component with one or more other local or remote computing device(s).

The vehicle computing device(s) 504 may include processor(s) 518 and memory 520 communicatively coupled with the one or more processors 518. Computing device(s) 514 may also include processor(s) 522, and/or memory 524. The processor(s) 518 and/or 522 may be any suitable processor capable of executing instructions to process data and perform operations as described herein. By way of example and not limitation, the processor(s) 518 and/or 522 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 520 and/or 524 may be examples of non-transitory computer-readable media. The memory 520 and/or 524 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 520 and/or memory 524 may store a localization component 526, perception component 528, planning component 530, integration component 532, and/or system controller(s) t 534,—zero or more portions of any of which may be hardware, such as GPU(s), CPU(s), and/or other processing units.

In at least one example, the localization component 526 may include hardware and/or software to receive data from the sensor(s) 506 to determine a position, velocity, and/or orientation of the vehicle 502 (e.g., one or more of an x-, y-, z-position, roll, pitch, or yaw). For example, the localization component 526 may include and/or request/receive map(s) of an environment and can continuously determine a location, velocity, and/or orientation of the autonomous vehicle within the map(s). In some instances, the localization component 526 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 526 may provide data to various components of the vehicle 502 to determine an initial position of an autonomous vehicle for generating a trajectory and/or for generating map data, as discussed herein. In some examples, localization component 526 may provide, to the perception component 528, a location and/or orientation of the vehicle 502 relative to the environment and/or sensor data associated therewith.

In general, the perception component 528 may determine what is in the environment surrounding the vehicle 502 and the planning component 530 may determine how to operate the vehicle 502 according to information received from the perception component 528. The perception component 528 may generate perception data, which may comprise data associated with static objects in the environment (static object data) and/or data associated with dynamic objects in the environment (dynamic object data). For example, the static object data may indicate a likelihood that an object exists at a location in the environment and the dynamic object data may indicate a likelihood that an object occupies or will occupy a location in the environment. In some instances, the dynamic data may comprise multiple frames associated with different times steps at intervals up to a prediction horizon (i.e., a maximum time/distance for which dynamic data is predicted). For example, the dynamic object data may indicate a current position, heading, velocity, and/or the like associated with a dynamic object and at one or more future times. In some examples, the static object data and/or dynamic object data may be used to determine a cost associated with a predicted state of the vehicle and/or a candidate trajectory.

In some examples, the static and/or dynamic data determined by the perception component 528 based at least in part on the sensor data may comprise a top-down representation of such data, but any representation of the static and/or dynamic data is contemplated, such as a heat map, object classifications associated with detected objects, instance segmentation(s), semantic segmentation(s), two and/or three-dimensional bounding boxes, tracks, etc. The perception component 528 may additionally or alternatively determine global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), track data (e.g., the environment representations, object detections, and/or tracks discussed herein), etc. In some examples, perception data may comprise outputs of sensor specific pipelines (e.g., vision, lidar, radar) and/or hybrid sensor pipelines (e.g. vision-lidar, radar-lidar).

In some instances, perception component 528 may comprise a primary perception system and/or a prediction system implemented in hardware and/or software. The perception component 528 may detect object(s) in in an environment surrounding the vehicle 502 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. The perception component 528 may include a prediction component that predicts actions/states of dynamic components of the environment, such as moving objects. In some examples, the perception component 528 may comprise a pipeline of hardware and/or software, which may include one or more GPU(s), ML model(s), Kalman filter(s), and/or the like.

In some examples, the perception component 528 may comprise a prediction component that may determine the predicted portion of the track, which may comprise a predicted position, heading, steering rate, velocity, acceleration, classification (for those classifications that are malleable, such as cyclists that may become pedestrians), etc. The prediction component may comprise a simulation component, machine-learned model, or in additional or alternate examples, the prediction component may comprise a Kalman filter or the like. The perception component 528 may be used to determine predicted actions of object(s) external to the vehicle 502

The data produced by the perception component 528 may be collectively referred to as perception data. Once/as the perception component 528 generates perception data, the perception component 528 may provide the perception data to the planning component 530.

The planning component 530 may receive a location and/or orientation of the vehicle 502 from the localization component 526 and/or perception data from the perception component 528 and may determine instructions for controlling operation of the vehicle 502 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic, such as may be generated by system controller(s) of the drive component(s) 512)) that the drive component(s) 512 may parse/cause to be carried out, second instructions for the emitter(s) 508 may be formatted according to a second format associated therewith). In some examples, where the planning component 530 may comprise hardware/software-in-a-loop in a simulation (e.g., for testing and/or training the planning component 530), the planning component 530 may generate instructions which may be used to control a simulated vehicle. These instructions may additionally or alternatively be used to control motion of a real-world version of the vehicle 502, e.g., in instances where the vehicle 502 runs the simulation runs on vehicle during operation.

The planning component 530 may use the perception data received from perception component 528, to determine one or more trajectories, control motion of the vehicle 502 to traverse a path or route, and/or otherwise control operation of the vehicle 502, though any such operation may be performed in various other components (e.g., localization may be performed by a localization component, which may be based at least in part on perception data). For example, the planning component 530 may determine a route for the vehicle 502 from a first location to a second location, which may be based at least in part on a mission and map data, in at least one example. For a mission that includes picking up a passenger at one location and dropping the passenger off at another location (potentially with intervening waypoints), the planning component may determine a route that specifies the roadways or roadway portions to accomplish the mission. Note that such a route is a mission-level route that is different than the route used by the integrator. The route used by the integrator discussed herein may also be referred to as a lane reference, which identifies a portion of a roadway to be occupied by the vehicle. This lane reference may be determined by the integrator in a pre-processing operation that determines the lane reference based at least in part on the mission route and a roadway edge.

In some examples, in order to generate a path, which may comprise multiple contiguous trajectories (e.g., one trajectory begins where another one ends, including a continuous heading, velocity, acceleration, etc.), the planning component 530 may execute a tree search and may determine action node(s) and/or prediction node(s) of the tree search by transmitting a request for the planning component to generate candidate action(s) based at least in part on an environment determined in association with a prediction node. The planning component 530 may receive an initial state of the environment from the perception component 528 (i.e., in association with a root node of the tree search), which the planning component 530 may use to determine one or more candidate actions for a first time period (e.g., 0 to 1 second, 0 to 2 seconds, 0 to 0.5 seconds in the future). For example, the tree search may include executing a Monte-Carlo tree search (MCTS); partially observable Monte-Carlo planning (POMCP); Markov decision process (MDP), such as a partially observable MDP (POMDP); or the like.

A final trajectory for controlling the vehicle 502 may ultimately be selected by the planning component 530 from among the candidate trajectories according to the techniques discussed herein. A trajectory may indicate a target heading, target steering angle, target steering rate, target position, target velocity, and/or target acceleration for the controller (s) to track, although the trajectory itself may comprise instructions for controller(s), which may, in turn, actuate a drive system of the vehicle 502. In some examples, hundreds, thousands, or millions of trajectories may be determined by the planning component 530 and multiple trajectories may be concatenated together over a time horizon to form a path (see U.S. patent application Ser. No. 17/394,334, filed Aug. 4, 2021, the entirety of which is incorporated by reference herein).

For example, a first trajectory may be selected from among a first set of candidate trajectories to control the vehicle 502 for t=0 to t=2 seconds, a second trajectory may be selected from among a second set of candidate trajectories to control the vehicle 502 for t=2 seconds to t=4 seconds, and so on until a time horizon is met (e.g., 5 seconds, 8 seconds, 10 seconds). Although an interval of two seconds is used in the example above, any other interval may be used (e.g., 10 milliseconds, 100 milliseconds, 500 milliseconds, 1 second, 2 seconds, 5 seconds). In such an example, the second set of candidate trajectories may be generated based at least in part on the first set of candidate trajectories and/or the first trajectory such that a continuous path may be generated. In other words, the second trajectory may start where the first trajectory ends and may be associated with a velocity, heading, steering rate, acceleration, etc. that is continuous with the first trajectory.

The planning component 530 may transmit at least one of these one or more candidate actions to the integration component 532, which may determine a predicted state of the vehicle 502 that may be the result of implementing the candidate trajectory at the vehicle. This process may be iterated until a time horizon, distance, progress along a route, target position, and/or suitable path is reached/determined. For example, after determining a prediction of a future state of the vehicle and the environment (including any dynamic objects, whether reactive or passive) at the end of the first time period (e.g., 1 second in the future, 2 seconds, 0.5 seconds), the planning component 530 may determine a second set of candidate actions for a second time period (e.g., 1 to 2 seconds, 2 to 4 seconds, 0.5 to 1 second in the future) based at least in part on a previous candidate action chosen and/or prediction associated therewith. In some examples, once a complete path has been formed by respective candidate trajectories, the respective predicted states of the vehicle may be used to determine sub-costs associated with the path, which may be summed to determine a total cost associated with the path.

The integration component 532 may operate on the vehicle 502 as a part of the planning component 530 (e.g., to determine a predicted state of the vehicle 502 that would result from implementing a particular trajectory) or may operate on the computing device(s) 514 to determine a lane reference based at least in part on sensor data and/or map data stored in memory 524. The integration component 532 may receive a candidate trajectory from an upstream component of the planning component 530 and the integration component 532 may determine the predicted state, as discussed herein. The predicted state may be used to determine a cost associated with the candidate trajectory and may ultimately be used to determine a total cost associated with a path comprising multiple trajectories. This is equivalently discussed herein as a cost associated with a portion of a trajectory and a total cost associated with the candidate trajectory.

The memory 520 and/or 524 may additionally or alternatively store a mapping system, a planning system, a ride management system, etc. Although perception component 528, planning component 530, and/or integration component 532 are illustrated as being stored in memory 520, perception component 528, planning component 530, and/or integration component 532 may include processor-executable instructions, machine-learned model(s) (e.g., a neural network), and/or hardware.

As described herein, the localization component 526, the perception component 528, the planning component 530, and/or other components of the system 500 may comprise one or more ML models. For example, localization component 526, the perception component 528, the and/or planning component 530 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, the entirety of which is incorporated by reference herein), and/or VoxelNet. Architecture latency optimizations may include MobilenetV2, Shufflenet, Channelnet, Peleenet, and/or the like. The ML model may comprise a residual block such as Pixor, in some examples.

Memory 520 may additionally or alternatively store one or more system controller(s) 534 (which may be a portion of the drive component(s)), which may be configured to control steering, propulsion, braking, safety, emitters, communication, and other systems of the vehicle 502. These system controller(s) 534 may communicate with and/or control corresponding systems of the drive component(s) 512 and/or other components of the vehicle 502. For example, the planning component 530 may generate instructions based at least in part on perception data generated by the perception component 528, such as according the techniques discussed herein that reduce the compute and/or compute time to determine a trajectory to control the vehicle 502, and transmit the instructions to the system controller(s), which may control operation of the vehicle 502 based at least in part on the instructions.

It should be noted that while FIG. 2 is illustrated as a distributed system, in alternative examples, components of the vehicle 502 may be associated with the computing device(s) 514 and/or components of the computing device(s) 514 may be associated with the vehicle 502. That is, the vehicle 502 may perform one or more of the functions associated with the computing device(s) 514, and vice versa.

EXAMPLE CLAUSES

A: A method comprising: receiving a route associated with operation of a vehicle, the route identifying a path between a start position and an end position and defined by a route rotation and route position with respect to a length along the route; determining a current state of the vehicle comprising a position, rotation, and velocity defined relative to the route; receiving a vehicle control identifying an acceleration and curvature for controlling the vehicle; one of: determining, as a numerical integrator and based at least in part on the curvature being less than or equal to a threshold curvature, to perform a numerical integration comprising a first integrator, or determining, as the numerical integrator and based at least in part on the curvature being greater than the threshold curvature, a second integrator; determining, based at least in part on the numerical integrator and the vehicle control, a predicted state of the vehicle; determining a final trajectory for controlling the vehicle based at least in part on the predicted state; and controlling the vehicle based at least in part on the final trajectory.

B: The method of paragraph A, wherein determining the final trajectory is based at least in part on: determining a cost associated with the predicted state; and determining, as the final trajectory, a trajectory from among a candidate trajectory comprising the vehicle control and one or more additional candidate trajectories, based at least in part on the cost the candidate trajectory to reduce the cost.

C: The method of either paragraph A or B, wherein the position of the vehicle is offset from the route and the rotation differs from the route.

D: The method of any one of paragraphs A-C, wherein the numerical integrator is the first integrator and determining the predicted state is based at least in part on: determining a predicted route-relative position of the vehicle at the endpoint based at least in part on a route-relative rotation of the vehicle, a change in route rotation over the length, a change in route position over the length, and a current route-relative position of the vehicle; and determining a predicted route-relative rotation of the vehicle at the endpoint based at least in part on the change in the route rotation and the current route-relative rotation of the vehicle.

E: The method of any one of paragraphs A-D, wherein the numerical integrator is the second integrator and determining the predicted state is based at least in part on: determining a predicted route-relative position of the vehicle at the endpoint based at least in part on determining a closest of two roots determined based at least in part on a curvature associated with the vehicle control, a current route-relative position of the vehicle, a current route-relative rotation of the vehicle, a change in route rotation over the length, and a change in route position over the length; determining a predicted route-relative rotation of the vehicle at the endpoint based at least in part on the current route-relative rotation of the vehicle, the current rotation of the route, the predicted route-relative position, and the curvature; determining a distance moved by the vehicle; and determining a predicted velocity of the vehicle at the endpoint based at least in part on a current velocity of the vehicle, the acceleration identified by the candidate trajectory, and the distance moved by the vehicle.

G: A system comprising: one or more processors; and a memory storing processor-executable instructions that, when executed by the one or more processors, cause the system to perform operations comprising: receiving a route associated with operation of a vehicle; determining a current state of the vehicle comprising a position and rotation defined relative to the route; receiving a vehicle control comprising an acceleration and steering angle for controlling the vehicle; one of: determining, as a numerical integrator and based at least in part on the steering angle being less than or equal to a threshold steering angle, to perform a numerical integration comprising a first integrator, or determining, as the numerical integrator and based at least in part on the steering angle being greater than the threshold steering angle, a second integrator; determining, based at least in part on the numerical integrator and the vehicle control, a predicted state of the vehicle; and determining a final trajectory for controlling the vehicle based at least in part on the predicted state.

H: The system of paragraph G, wherein the current state is associated with a lane reference and the candidate trajectory identifies a next proposed segment to add to the lane reference.

I: The system of either paragraph G or H, wherein determining the predicted state is based at least in part on: determining a curvature of the candidate trajectory from the position of the vehicle to a second position associated with an endpoint of the length; based at least in part on determining that the curvature is less than a curvature threshold, determining the predicted state based at least in part on: determining a predicted route-relative position of the vehicle at the endpoint based at least in part on a route-relative rotation of the vehicle, a change in route rotation over the length, a change in route position over the length, and the current route-relative position of the vehicle; and determining a predicted route-relative rotation of the vehicle at the endpoint based at least in part on the change in the route rotation and the current route-relative rotation of the vehicle;

J: The system of any one of paragraphs G-I, wherein determining the predicted state further comprises: determining a distance moved by the vehicle, relative to a vehicle frame, based at least in part on the predicted route-relative position, the current route-relative rotation of the vehicle, the change in route rotation over the length, the change in route position over the length, and the current route-relative position of the vehicle; and determining a predicted velocity of the vehicle at the endpoint based at least in part on a current velocity of the vehicle, the acceleration identified by the candidate trajectory, and the distance moved by the vehicle.

K: The system of any one of paragraphs G-J, wherein determining the predicted state is based at least in part on: determining a curvature of the candidate trajectory from the position of the vehicle to a second position associated with an endpoint of the length; based at least in part on determining that the curvature meets or exceeds a curvature threshold, determining the predicted state based at least in part on: determining a predicted route-relative position of the vehicle at the endpoint based at least in part on determining a closest of two roots determined based at least in part on the curvature, current route-relative position of the vehicle, a current route-relative rotation of the vehicle, a change in route rotation over the length, and a change in route position over the length; and determining a predicted route-relative rotation of the vehicle at the endpoint based at least in part on the current route-relative rotation of the vehicle, the current rotation of the route, and the curvature.

L: The system of paragraph K, wherein determining the predicted state further comprises: determining a distance moved by the vehicle; and determining a predicted velocity of the vehicle at the endpoint based at least in part on a current velocity of the vehicle, the acceleration identified by the candidate trajectory, and the distance moved by the vehicle.

M: The system of paragraph L, wherein the acceleration is greater than or equal to a value being one or more of inversely proportional to the velocity at the current state or proportional to the distance moved by the vehicle.

N: One or more non-transitory computer-readable media storing processor-executable instructions that, when executed by one or more processors, cause one or more processors to perform operations comprising: receiving a route associated with operation of a vehicle; determining a current state of the vehicle comprising a position and rotation defined relative to the route; receiving a vehicle control comprising an acceleration and steering angle for controlling the vehicle; one of: determining, as a numerical integrator and based at least in part on the steering angle being less than or equal to a threshold steering angle, to perform a numerical integration comprising a first integrator, or determining, as the numerical integrator and based at least in part on the steering angle being greater than the threshold steering angle, a second integrator; determining, based at least in part on the numerical integrator and the vehicle control, a predicted state of the vehicle; and determining a final trajectory for controlling the vehicle based at least in part on the predicted state.

O: The one or more non-transitory computer-readable media of paragraph N, wherein the current state is associated with a lane reference and the candidate trajectory identifies a next proposed segment to add to the lane reference.

P: The one or more non-transitory computer-readable media of either paragraph N or O, wherein determining the predicted state is based at least in part on: determining a curvature of the candidate trajectory from the position of the vehicle to a second position associated with an endpoint of the length; based at least in part on determining that the curvature is less than a curvature threshold, determining the predicted state based at least in part on: determining a predicted route-relative position of the vehicle at the endpoint based at least in part on a route-relative rotation of the vehicle, a change in route rotation over the length, a change in route position over the length, and the current route-relative position of the vehicle; and determining a predicted route-relative rotation of the vehicle at the endpoint based at least in part on the change in the route rotation and the current route-relative rotation of the vehicle;

Q: The one or more non-transitory computer-readable media of any one of paragraphs N-P, wherein determining the predicted state further comprises: determining a distance moved by the vehicle, relative to a vehicle frame, based at least in part on the predicted route-relative position, the current route-relative rotation of the vehicle, the change in route rotation over the length, the change in route position over the length, and the current route-relative position of the vehicle; and determining a predicted velocity of the vehicle at the endpoint based at least in part on a current velocity of the vehicle, the acceleration identified by the candidate trajectory, and the distance moved by the vehicle.

R: The s one or more non-transitory computer-readable media of any one of paragraphs N-Q, wherein determining the predicted state is based at least in part on: determining a curvature of the candidate trajectory from the position of the vehicle to a second position associated with an endpoint of the length; based at least in part on determining that the curvature meets or exceeds a curvature threshold, determining the predicted state based at least in part on: determining a predicted route-relative position of the vehicle at the endpoint based at least in part on determining a closest of two roots determined based at least in part on the curvature, current route-relative position of the vehicle, a current route-relative rotation of the vehicle, a change in route rotation over the length, and a change in route position over the length; and determining a predicted route-relative rotation of the vehicle at the endpoint based at least in part on the current route-relative rotation of the vehicle, the current rotation of the route, and the curvature.

S: The one or more non-transitory computer-readable media of paragraph R, wherein determining the predicted state further comprises: determining a distance moved by the vehicle; and determining a predicted velocity of the vehicle at the endpoint based at least in part on a current velocity of the vehicle, the acceleration identified by the candidate trajectory, and the distance moved by the vehicle.

T: The one or more non-transitory computer-readable media of paragraph S, wherein the acceleration is greater than or equal to a value being one or more of inversely proportional to the velocity at the current state or proportional to the distance moved by the vehicle.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
receiving a route associated with operation of a vehicle, the route identifying a path between a start position and an end position and defined by a route rotation and route position with respect to a length along the route;
determining a current state of the vehicle indicating a lateral offset and an angular offset from the route;
receiving a vehicle control identifying an acceleration and curvature for controlling the vehicle over a future time period;
one of:
determining, as a numerical integrator and based at least in part on the curvature being less than or equal to a threshold curvature, to perform a numerical integration comprising a first integrator, or
determining, as the numerical integrator and based at least in part on the curvature being greater than the threshold curvature, a second integrator;
determining, by the numerical integrator and based at least in part on the vehicle control, a predicted state of the vehicle, wherein the predicted state indicates a predicted lateral offset and a predicted angular offset from the route at a displacement along the route that are predicted to result from applying the vehicle control to the vehicle;
determining a final trajectory for controlling the vehicle based at least in part on the predicted state; and
controlling the vehicle based at least in part on the final trajectory.

2. The method of claim 1, wherein determining the final trajectory is based at least in part on:
determining a cost associated with the predicted state; and
determining, as the final trajectory, a trajectory from among a candidate trajectory comprising the vehicle control and one or more additional candidate trajectories, based at least in part on the cost the candidate trajectory to reduce the cost.

3. The method of claim 1, wherein the rotation differs from the route.

4. The method of claim 1, wherein the numerical integrator is the first integrator and determining the predicted state is based at least in part on:
determining a predicted route-relative position of the vehicle at the end position based at least in part on a route-relative rotation of the vehicle, a change in route rotation over the length along the route, a change in route position over the length, and a current route-relative position of the vehicle; and
determining a predicted route-relative rotation of the vehicle at the end position based at least in part on the change in the route rotation and a current route-relative rotation of the vehicle.

5. The method of claim 1, wherein the numerical integrator is the second integrator and determining the predicted state is based at least in part on:
determining a predicted route-relative position of the vehicle at the end position based at least in part on determining a closest estimated position to a position of the vehicle from among two estimated positions determined based at least in part on a curvature associated with the vehicle control, a current route-relative position of the vehicle, a current route-relative rotation of the vehicle, a change in route rotation over the length along the route, and a change in route position over the length;
determining a predicted route-relative rotation of the vehicle at the end position based at least in part on the current route-relative rotation of the vehicle, a current rotation of the route, the predicted route-relative position, and the curvature;
determining a distance moved by the vehicle; and
determining a predicted velocity of the vehicle at the end position based at least in part on a current velocity of the vehicle, the acceleration identified by the vehicle control, and the distance moved by the vehicle.

6. The method of claim 1, wherein the current state is associated with a lane reference and the vehicle control identifies a next proposed segment to add to the lane reference.

7. A system comprising:
one or more processors; and
a memory storing processor-executable instructions that, when executed by the one or more processors, cause the system to perform operations comprising:
receiving a route associated with operation of a vehicle;
determining a current state of the vehicle comprising a position and rotation defined relative to the route;
receiving a candidate trajectory comprising an acceleration and steering angle for controlling the vehicle over a future time period;
one of:
determining, as a numerical integrator and based at least in part on the steering angle being less than or equal to a threshold steering angle, to perform a numerical integration comprising a first integrator, or
determining, as the numerical integrator and based at least in part on the steering angle being greater than the threshold steering angle, a second integrator;
determining, by the numerical integrator and based at least in part on the candidate trajectory, a predicted state of the vehicle indicating a predicted lateral offset and a predicted angular offset from the route; and
determining a final trajectory for controlling the vehicle based at least in part on modifying the candidate trajectory based at least in part on the predicted state.

8. The system of claim 7, wherein the current state is associated with a lane reference and the candidate trajectory identifies a next proposed segment to add to the lane reference.

9. The system of claim 7, wherein determining the predicted state is based at least in part on:
determining a curvature of the candidate trajectory from the position of the vehicle to a second position associated with an endpoint of a length along the route;
based at least in part on determining that the curvature is less than a curvature threshold, determining the predicted state based at least in part on:
determining a predicted route-relative position of the vehicle at the endpoint based at least in part on a route-relative rotation of the vehicle, a change in route rotation over the length, a change in route position over the length, and a current route-relative position of the vehicle; and determining a predicted route-relative rotation of the vehicle at the endpoint based at least in part on the change in the route rotation and a current route-relative rotation of the vehicle.

10. The system of claim 9, wherein determining the predicted state further comprises:
determining a distance moved by the vehicle, relative to a vehicle frame, based at least in part on the predicted route-relative position, the current route-relative rotation of the vehicle, the change in route rotation over a length along the route, the change in route position over the length, and the current route-relative position of the vehicle; and
determining a predicted velocity of the vehicle associated with an endpoint of the route based at least in part on a current velocity of the vehicle, the acceleration identified by the candidate trajectory, and the distance moved by the vehicle.

11. The system of claim 7, wherein determining the predicted state is based at least in part on:
determining a curvature of the candidate trajectory from the position of the vehicle to a second position associated with an endpoint of a length along the route;
based at least in part on determining that the curvature meets or exceeds a curvature threshold, determining the predicted state based at least in part on:
determining a predicted route-relative position of the vehicle at the endpoint based at least in part on determining a closest root to the position of the vehicle from among two roots determined based at least in part on the curvature, a current route-relative position of the vehicle, a current route-relative rotation of the vehicle, a change in route rotation over the length, and a change in route position over the length; and
determining a predicted route-relative rotation of the vehicle at the endpoint based at least in part on the current route-relative rotation of the vehicle, a current rotation of the route, and the curvature.

12. The system of claim 11, wherein determining the predicted state further comprises:
determining a distance moved by the vehicle; and
determining a predicted velocity of the vehicle at the endpoint based at least in part on a current velocity of the vehicle, the acceleration identified by the candidate trajectory, and the distance moved by the vehicle.

13. The system of claim 7, wherein the first integrator and the second integrator enforce a constraint that the acceleration is greater than or equal to a value determined by a negative of dividing a distance moved by the vehicle by a current velocity of the vehicle.

14. One or more non-transitory computer-readable media storing processor-executable instructions that, when executed by one or more processors, cause one or more processors to perform operations comprising:
receiving a route associated with operation of a vehicle;
determining a current state of the vehicle comprising a position and rotation defined relative to the route;
receiving a candidate trajectory comprising an acceleration and steering angle for controlling the vehicle over a future time period;
one of:
determining, as a numerical integrator and based at least in part on the steering angle being less than or equal to a threshold steering angle, to perform a numerical integration comprising a first integrator, or
determining, as the numerical integrator and based at least in part on the steering angle being greater than the threshold steering angle, a second integrator;
determining, by the numerical integrator and based at least in part on the candidate trajectory, a route-relative predicted state of the vehicle indicating a predicted lateral offset and a predicted angular offset from the route; and
determining a final trajectory for controlling the vehicle based at least in part on the route-relative predicted state.

15. The one or more non-transitory computer-readable media of claim 14, wherein the current state is associated with a lane reference and the candidate trajectory identifies a next proposed segment to add to the lane reference.

16. The one or more non-transitory computer-readable media of claim 14, wherein determining the route-relative predicted state is based at least in part on:
determining a curvature of the candidate trajectory from the position of the vehicle to a second position associated with an endpoint of a length along the route;
based at least in part on determining that the curvature is less than a curvature threshold, determining the route-relative predicted state based at least in part on:
determining a predicted route-relative position of the vehicle at the endpoint based at least in part on a route-relative rotation of the vehicle, a change in route rotation over the length, a change in route position over the length, and a current route-relative position of the vehicle; and
determining a predicted route-relative rotation of the vehicle at the endpoint based at least in part on the change in the route rotation and a current route-relative rotation of the vehicle.

17. The one or more non-transitory computer-readable media of claim 16, wherein determining the route-relative predicted state further comprises:
determining a distance moved by the vehicle, relative to a vehicle frame, based at least in part on the predicted route-relative position, the current route-relative rotation of the vehicle, the change in route rotation over a length along the route, the change in route position over the length, and the current route-relative position of the vehicle; and
determining a predicted velocity of the vehicle at the endpoint based at least in part on a current velocity of the vehicle, the acceleration identified by the candidate trajectory, and the distance moved by the vehicle.

18. The one or more non-transitory computer-readable media of claim 14, wherein determining the route-relative predicted state is based at least in part on:
determining a curvature of the candidate trajectory from the position of the vehicle to a second position associated with an endpoint of a length along the route;
based at least in part on determining that the curvature meets or exceeds a curvature threshold, determining the route-relative predicted state based at least in part on:
determining a predicted route-relative position of the vehicle at the endpoint based at least in part on determining a closest root to the position of the vehicle from among two roots determined based at least in part on the curvature, a current route-relative position of the vehicle, a current route-relative rotation of the vehicle, a change in route rotation over the length, and a change in route position over the length; and determining a predicted route-relative rotation of the vehicle at the endpoint based at least in part on the current route-relative rotation of the vehicle, a current rotation of the route, and the curvature.

19. The one or more non-transitory computer-readable media of claim 18, wherein determining the route-relative predicted state further comprises:
   determining a distance moved by the vehicle; and
   determining a predicted velocity of the vehicle at the endpoint based at least in part on a current velocity of the vehicle, the acceleration identified by the candidate trajectory, and the distance moved by the vehicle.

20. The one or more non-transitory computer-readable media of claim 14, wherein the first integrator and the second integrator enforce a constraint that the acceleration is greater than or equal to a value determined by a negative of division of a distance moved by the vehicle by a current velocity of the vehicle.

* * * * *